March 30, 1937.   W. L. MARDEN   2,075,126
APPARATUS FOR THE MEASURED DISPENSING OF LIQUIDS
Filed May 26, 1936    2 Sheets-Sheet 1
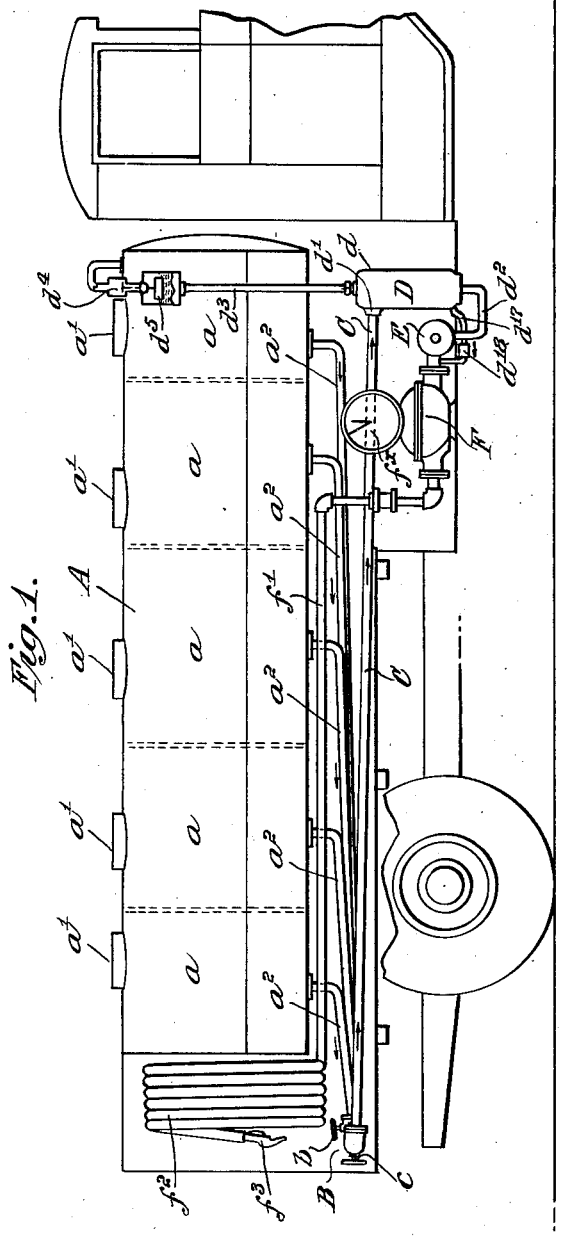
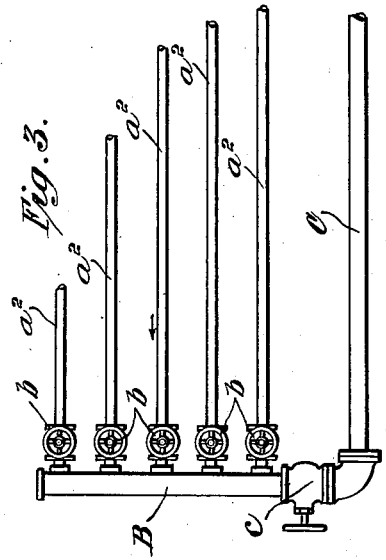
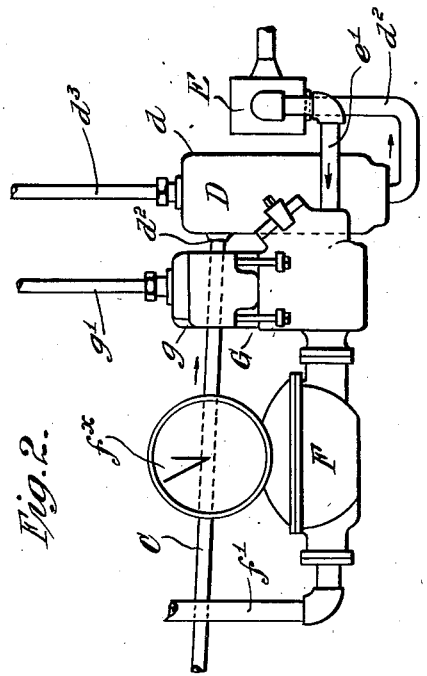
INVENTOR
William L. Marden
BY Redding, Greeley & O'Shea
ATTORNEYS March 30, 1937. W. L. MARDEN 2,075,126
APPARATUS FOR THE MEASURED DISPENSING OF LIQUIDS
Filed May 26, 1936 2 Sheets-Sheet 2
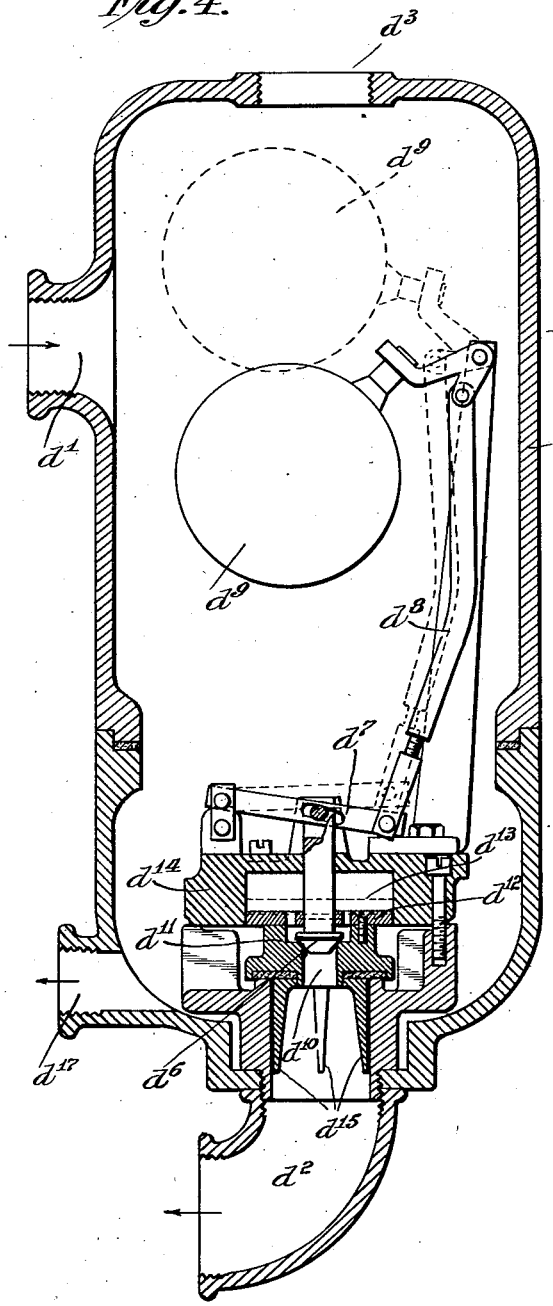
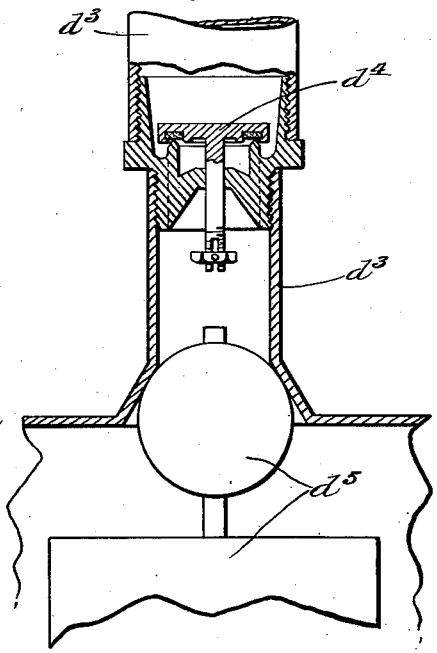
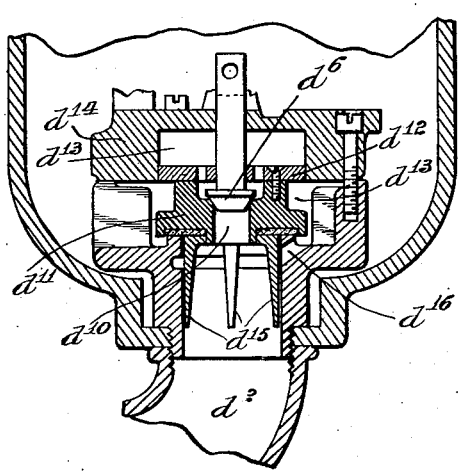
INVENTOR
William L. Marden
BY
Redding, Greeley & O'Shea
ATTORNEYS Patented Mar. 30, 1937

2,075,126

UNITED STATES PATENT OFFICE 2,075,126

APPARATUS FOR THE MEASURED DISPENSING OF LIQUIDS

William L. Marden, Jackson Heights, N. Y., assignor to Neptune Meter Company, New York, N. Y., a corporation of New Jersey Application May 26, 1936, Serial No. 81,792

3 Claims. (Cl. 221—67)

The present invention, although capable of application to other specific industrial uses, has been developed with particular reference to the dispensing of oil, gasoline, or the like, from a supply tank, which may be mounted on a truck, to storage tanks. The tanks of such tank trucks are commonly formed with several compartments from one or another or from two or more of which at one time the liquid may flow by gravity or, as usual, under the influence of a suction pump which discharges the liquid through a meter and thence through a discharge hose to the receptacle. The handling of such liquids, particularly of gasoline, is quite generally the subject of local ordinances or fire regulations or insurance regulations and the nature of the liquid being handled, particularly in the case of gasoline, and the conditions under which it is handled are such, unless their effect is counteracted in some way, as to cause error in the operation of the meter, as by the passage of air or gas in the direction of flow, or by the creation of a partial vacuum in the pipe connections between the meter and the pump by which at sometime during the operation, as at the time when the pump is stopped, the operation of the meter may actually be reversed for a short time. It has been sought heretofore to meet all such requirements and to prevent such error in the operation of the meter and various devices have been provided to such ends. Some of such devices have been in a measure successful, but as yet have not been sufficient to prevent air or gas from reaching the meter under all conditions of operation. In has been the object of this invention to overcome the remaining difficulties and particularly to prevent the subjection of the liquid in the meter and beyond to the reaction of a partial vacuum created by the devices employed. The novel means whereby the desired results are accomplished will be more fully explained hereinafter with reference to the embodiments of the invention shown in the accompanying drawings in which:

Figure 1 is a view in elevation, partly broken away, of a tank truck equipped with devices designed to accomplish the purposes of the invention.

Figure 2 is a detail view on a larger scale, partly in section, showing an embodiment of the invention slightly different from that shown in Figure 1 and in which an air release is provided between the pump and the meter.

Figure 3 is a detail plan view illustrating particularly the manifold and connections through which the liquid may be drawn from one or another or from several of the compartments of the tank under the influence of gravity in part or of the suction pump provided for the purpose.

Figure 4 is a view in vertical section, on a larger scale, of the automatic flow control valve.

Figure 5 is a detail view in section illustrating particularly the application of an overflow float and check valve to the vent pipe of the control valve container.

Figure 6 is a detail view in section illustrating the provision of a by-pass about the float control valve which may be made in some instances to prevent the formation of a partial vacuum.

In Figure 1 the supply tank A, which may be mounted in any usual or suitable manner upon a truck or elsewhere, is formed with separate compartments, as at $a$, $a$, each provided with a filling cap, as at $a^1$. Each compartment is connected, as by a pipe $a^2$, with a manifold B, provided as at $b$, with valves through which the flow of liquid from each feeder pipe $a^2$ may be controlled. The manifold is connected, through a valve $c$, with a pipe C through which, at the will of the operator, the liquid to be dispensed is discharged into an automatic float control valve D comprising a container $d$ into which the liquid is delivered, as at $d^1$, and from which, under the control of the float valve to be described, it is delivered, either by gravity or by suction, through a connection, as at $d^2$, to the pump, indicated at E, which may be of any suitable type but is preferably a rotary pump of usual construction.

At its upper end the container $d$ is provided with a vent pipe $d^3$ through which liberated air or gas, as the case may be, is returned to one or another of the compartments $a$ of the tank A. This vent pipe $d^3$ is provided, as at $d^4$, with a check valve which opens upward to permit the passage of air or gas, but in the absence of pressure from below closes to prevent the entry of air or gas and thereby to maintain a partial vacuum in the vent pipe $d^3$ and in the control valve container $d$, the capacity of which should be such as to permit the retention in the container of a substantial body of liquid at all times while the apparatus is in operation. The pipe is also provided, preferably but not necessarily, with a float valve, indicated at $d^5$, which is raised by the entry of liquid from below sufficiently to prevent the overflow of liquid from the container $d$ and the pipe $d^3$.

The float valve within the container $d$ is designed to permit the passage of liquid from the container to the pump so long as there is a sufficient volume in the container and to prevent the passage of liquid and of air or gas from the container to the pump when the volume of liquid in the container falls below a predetermined point. The valve itself, as shown in Figure 4, may be of known construction, comprising a pilot or primary valve $d^6$ connected through suitable linkage $d^7$, $d^8$, with a float $d^9$ supported within the container. To pilot valve $d^6$ controls the passage of liquid through the central bore $d^{10}$ of the main valve $d^{11}$, some degree of lost motion between the pilot valve and the main valve being provided for, as shown in Figure 4. Connected with the body of the main valve $d^{11}$ is a perforated piston $d^{12}$ operating within a chamber $d^{13}$ in the casing or body $d^{14}$ of the main valve. Unseating of the pilot valve $d^6$ from the main valve $d^{11}$ by the upward movement of the float $d^9$ places the chamber $d^{13}$ in direct communication with the outlet $d^2$ to the pump. The degree of suction then present in the chamber $d^{13}$ being the same as that exerted against the underside of the valve $d^{11}$ and the area of the piston $d^{12}$ being greater than the area of the seat of the valve $d^{11}$, the tendency of the suction created by the pump will be to urge the main valve open so long as there is sufficient liquid in the container $d$ to float the ball $d^9$. Suitable guides $d^{15}$ are provided to prevent tilting of the main valve.

It will be understood that the liquid delivered from the container of the automatic control valve to the pump is discharged by the pump through the meter F, which is provided as usual with a volume indicator $f^x$, and a pipe $f^1$ to a suitable hose $f^2$ conveniently mounted at the end of the tank and provided with a suitable spring loaded check valve $f^3$ of usual construction, by which the delivery of liquid from the hose into the receptacle provided may be controlled.

In the operation of the apparatus thus far described one or another of the compartments $a$ is connected through the feeder pipe $a^2$ and the opening of the corresponding valve $b$ with the manifold B, which in turn is connected through the opening of the valve $c$ and the pipe C, with the automatic control valve D. The liquid rises in the container $d$ of the automatic control valve, forcing the air above it in the container and in the vent pipe $d^3$ through the check valve $d^4$ into the compartment $a$ with which the vent pipe is connected. If the liquid rises sufficiently to float the float check valve at $d^5$ the overflow of the liquid from the container is thereby prevented. The operation of the pump promotes the flow of the liquid from the compartment into the container, the pilot valve $d^6$ and the main valve $d^{11}$ being then open, and lowers the level of the liquid in the container and in the vent pipe $d^3$ thus creating a partial vacuum between the new level of the liquid in the container and the check valve, without preventing the outward flow of air or gas as the liquid rises in the container. It will be obvious that the capacity of the container and the vent pipe should be such as to prevent the level of the liquid being lowered to such a point that the discharge valve of the container will close partially, the rate of flow of the liquid then being only such as is due to gravity, suction of the pump being reduced or stopped entirely by the partial or complete closing of the valve. It will be observed that the check valve $d^4$ is effective in maintaining through the creation of a partial vacuum, which acts to draw in liquid from the pipe C, a sufficient body of liquid in the container and vent pipe to provide for a further flow of liquid, as well as to promote a flow of liquid at a rate in excess of the rate of flow by gravity alone.

In the embodiment of the invention illustrated in Figure 2 there is shown interposed between the pump E and the meter F an air release, the purpose of which is to eliminate from the liquid before it enters the meter such air or gas as may have been introduced into the system at either the beginning or the end of an operation. The air release G consists of a vessel $g$ connected to the discharge pipe $e^1$ from the pump E to the meter F and a pipe $g^1$ which may be connected to any compartment of the supply tank for the purpose of returning to the tank whatever air or vapor is released. Such an air release makes provision for the elimination of whatever air may be introduced into the system through the by-pass around the control valve, as illustrated in Figure 6. It will be obvious that with the control valve constructed as shown in Figure 4, without a by-pass, a partial vacuum might be created in the connections between the control valve and the pump by the continued running of the pump after the closing of the control valve. To prevent the creation of such a partial vacuum there may be provided, as shown in Figure 6, a by-pass, as at $d^{16}$, between the valve chamber $d^{13}$ and the discharge outlet of the container $d$. Such a by-pass obviously will prevent the creation of such partial vacuum and will also make provision for the scavenging of whatever liquid may remain in the container and the connections. It will also be obvious that such by-pass may permit the introduction of air into the system and it is a function of the air release G to eliminate such air before the liquid reaches the meter.

It is apparent that if the control valve should be closed by lowering of the liquid level in the container $d$ and the pump should be continued in operation to such an extent that the connection $d^2$ to the pump should be highly evacuated, continued existence of such partial vacuum might cause the meter to run backward when the pump was stopped with a resulting false registration on the meter. To prevent this there may be provided, as shown in Figure 1, a by-pass connection $d^{17}$ from the bottom of the container $d$ to a point in the discharge pipe of the pump E in advance of the meter F. This by-pass pipe $d^{17}$ is provided with a check valve $d^{18}$ opening toward the meter and acting to prevent any flow from the meter toward the container $d$. It will be understood, of course, that for the functioning of such by-pass connection the capacity of the connection will be materially less than the capacity of the container $d$. Such by-pass connection serves to dissipate, through the admission of liquid from the container, the vacuum which would otherwise exist in the connections and would cause the backward running of the meter when the pump is stopped.

It will be noted that as the check valve $d^4$ in the vent $d^3$ prevents the entrance of air through the vent into the container, air might be drawn into the pipe connection from an empty compartment of the tank along with liquid from a full or partially full compartment. Separation of the air and liquid would take place in the container and the partial vacuum in the container would be partly dissipated. The level of the liquid in the container would then fall and the outflow of liquid from the container would be limited to the liquid supply to the container by gravity alone and therefore without admixture of air induced by the action of the pump.

It will be understood that various changes in details of construction and arrangement may be made to suit different conditions of use and that, except as pointed out in the accompanying claims, the invention is not restricted to the particular construction shown and described herein.

I claim as my invention:

1. An apparatus for the measured dispensing of liquid comprising a supply tank, a container to which the liquid may be delivered from the supply tank, an automatic float control valve by which the discharge of liquid from the container may be controlled, a suction and discharge pump connected to the container, a meter connected to the pump, a vent pipe connected to the container and provided with an outwardly opening check valve, a by-pass from the chamber of the control valve to the discharge from the container, and an air release interposed in the connection between the pump and the meter.

2. An apparatus for the measured dispensing of liquid comprising a supply tank, a container to which the liquid may be delivered from the supply tank, an automatic float control valve by which the discharge of liquid from the container may be controlled, a suction and discharge pump connected to the container, a meter connected to the pump, a vent pipe connected to the container and provided with an outwardly opening check valve, to relieve pressure within the container and to prevent the admission of air to the container when the liquid is being withdrawn by suction and an upwardly closing float check valve interposed in the vent pipe.

3. An apparatus for the measured dispensing of liquid comprising a supply tank, a container to which the liquid may be delivered from the supply tank, an automatic float control valve by which the discharge of liquid from the container may be controlled, a suction and discharge pump connected to the container, a meter connected to the pump, a vent pipe connected to the container and provided with an outwardly opening check valve, and a pipe connection from the bottom of the container to the connection between the pump and the meter and including a check valve opening toward the meter.

WILLIAM L. MARDEN.